United States Patent

[11] 3,561,587

[72] Inventor  Fritz Schausten
               Aachen, Germany
[21] Appl. No. 757,258
[22] Filed     Sept. 4, 1968
[45] Patented  Feb. 9, 1971
[73] Assignee  Leonard Monheim
               Aachen, Germany
[32] Priority  Sept. 4, 1967, Sept. 4, 1967
[33]           Germany
[31]           P 15 56 083.5 and P 15 56 084.6

[54] CONVEYOR BELT TURN
     8 Claims, 4 Drawing Figs.
[52] U.S. Cl. .................................................. 198/182,
                                                                198/184
[51] Int. Cl. .............................................. B65g 15/02
[50] Field of Search .......................................... 198/181,
                                                                182, 184

[56]         References Cited
         UNITED STATES PATENTS
3,358,811  12/1967  Gerrish .................... 198/182
             FOREIGN PATENTS
  733,498   7/1955  Great Britain ............. 198/182

Primary Examiner—Edward A. Sroka
Attorney—Walter Becker

ABSTRACT: A conveyor belt turn for diverting the path of a conveyor through a given angle, adapted to transport small separate articles supplied in a plurality of parallel rows. A smooth conveying surface is constituted by a sheet being circular or circular-ring shaped. At the feed and delivery ends the sheet is passed round nosing rollers of same diameter. The endless free outer edge of sheet is provided with a series of eyelets for the connection of resilient means being attached to a round link chain engaging a guide rail.

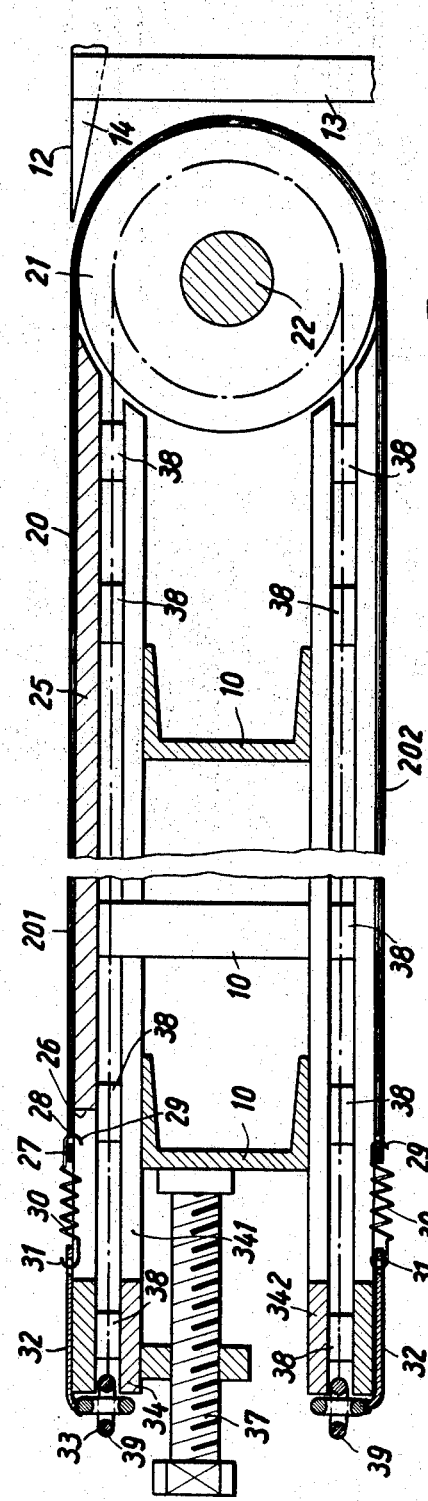
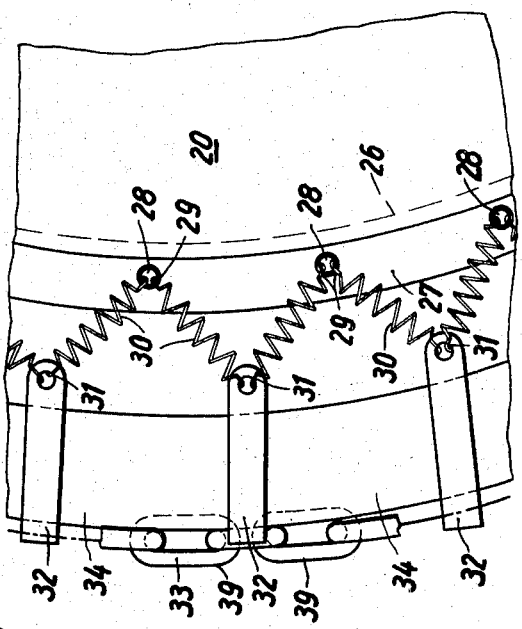

CONVEYOR BELT TURN

This invention relates to endless conveyors and more particularly to conveyor belt turns for diverting the path of a conveyor through a given angle. The primary object of the invention is the provision of conveying means adapted to change the direction of travel of the articles conveyed, or turn them through an arc, or convey them on a curved path. Another object of the invention is to provide a novel and improved conveyor belt turn and belt therefore which presents a flat, horizontal carrying surface that is adapted to transport small separate articles, in particular delicate confectionary such for example as pralines or confections coated with chocolate, which articles may be supplied in a plurality of parallel rows.

Conveyors are known having curved endless belts consisting of flat flexible material, which are let over tapered rollers and in which both edges of the endless belt are attached to the links of two roller or bush chains guided in rails. In such an arrangement a chain is situated on the inner and outer peripheral edge of the belt. Inner and outer guide rails are necessary which must be adjustable, in order to impart to the belt sufficient prestressing, requiring a complicate structure without ensuring a constant travel of the individual items along a predetermined path, which preferably are arranged in parallel rows on the carrier surface of the conveyor. Moreover both chains must be driven and tapered rollers have to be provided with sprocket wheels arranged at both ends of their supporting surfaces. The conical rollers necessitate a special machine frame adapted for horizontal feed and delivery belts. Moreover the radius of the turn must not be too small with regard to the structure of the roller or bush chains.

It is another object of the present invention to obviate these disadvantages and in particular to provide a smooth angular transverse for the belt in which the transport of small articles can be effected completely without trouble, especially in case of an arrangement of items in parallel rows. Another object of the invention is to provide a novel and improved conveyor belt turn where the angular guidance should be effected in the narrowest space, without any restriction on the angular curve required. Another object of the invention is to provide the conveyor belt for a turn which is adapted to rotate about the curved path of a turn and over the rollers at each end of the path without any tendency of moving laterally out of position and which is of simple balanced construction, neat appearing and easily installed.

The invention consists in an improved conveyor belt turn, comprising a frame having an arcuate guide rail, nosing rollers mounted radially of the frame at both ends of the guide rail, a smooth conveying surface constituted by a sheet formed of a clothlike material, said conveying surface being endless and carried by said frame and passing around said nosing rollers, said sheet having a free outer edge provided with a series of eyelets for the connection of resilient means, said resilient means being affixed to a round link driving chain engaging said guide rail, sand round link chain being driven by sprocket wheels coaxial with said nosing rollers, said sprocket wheels being connected to driving means.

Another object of the invention is to provide a novel and improved conveyor belt turn of 180° wherein the feed and delivery belts are situated close to one another. This is achieved according to the present invention in that the sheet of clothlike material is made circular and is placed axially symmetrical over a nosing axis having several independently movable rollers. The center of the sheet is thus situated below the conveying plane at about the level of the central phase of the nosing axis.

According to a further feature of the invention the feeding and delivery ends of the curved conveying surface are situated on a continuous axis, whereby in the region of the center of the circular sheet one or more rollers are replaced by a spacer sleeve of smaller diameter.

For any angular curve between 0° and 360° the sheet of clothlike material is placed over nosing axes supporting several independently movable cylindrical rollers as an endless, substantially circular ring-shaped belt.

Other details and features of the invention, including the construction and combination of its various parts, will be described in connection with embodiments and pointed out in the appended claims.

Reference is now made to the accompanying drawings, in which:

FIG. 2 is a cross section along the line II—II in FIG. 1 and FIG. 4,

FIG. 3 is an enlarged cutaway portion in plan view to illustrate the tensioning and guide members and FIG. 4 is a plan view of an angular conveyor traversing an angle of 180°.

Figure 1:
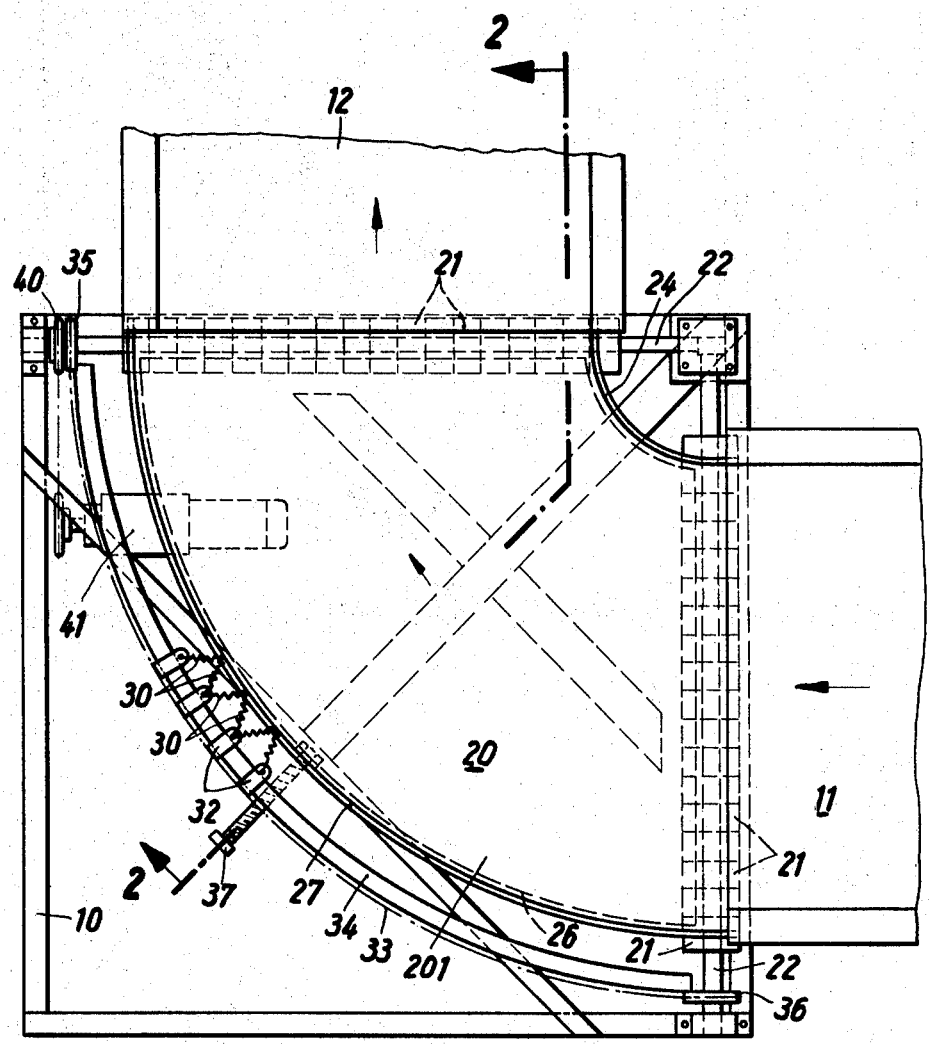
FIG. 1 is a plan view of an angular conveyor turning a corner of 90°.

Referring to the FIG., angular conveyor comprises a machine frame 10, alongside which a feed conveyor belt 11 and a receiving conveyor belt 12 are guided. As may be seen in FIG. 2, a separate machine frame 13 is also provided both for the conveyor belt 12 and for the conveyor belt 11 and is so brought near the angular conveyor 10 by a tonguelike projection 14, so that a practically continuous conveying surface is provided with only a slight bridging gap.

As shown in the drawings a sheet 20 made of clothlike material is arranged on the machine frame 10, which sheet has a substantially circular shape. The conveying surface forming sheet 20 is guided around nosing rollers 21, which are freely rotatable on axes 22. As shown in FIG. 1 the sheet is formed as a belt 20 of a substantially circular ring shape and the axes 22 are arranged in the present example at an angle of 90° and are located in bearings, which are provided on the machine frame at both ends of each axis. The clothlike conveyor belt 20 is bounded by an inner edge 24 and an outer peripheral edge. The edge 24 can be brought very close up to the central bearing, in order to obtain a wide conveying surface with the narrowest cutoff angle.

A conveying surface 201 of the sheet 20 moves on a plate 25, which consists of a flat level table, whose plan form is substantially identical with the surface of the angular curve of the sheet and is chamfered at its ends adjacent the inner surfaces of rollers 21 and the underside of the sheet. The peripheral edge 26 of the plate 25 has a smaller radius than the peripheral edge of the sheet 20. A stiffener 27 with a series of eyelets 28 is provided on the outer peripheral edge of the sheet 20. Fastening hooks 29 of resilient elements 30 grip in the eyelets 28, which elements are preferably coil springs. The coil springs 30 are fastened by the other fastening hooks 31 to a connecting member 32, which is connected to the perpendicularly situated links of a round link chain 33. Between an eyelet 28 and a corresponding connecting member 32 a radially directed spring can be arranged in each case, but preferably two coil springs 30 are provided which deviate apart from one eyelet 28 outwardly in each case to adjacent connecting members 32. The round link chain 33 is guided between an upper and a lower rail 34, which comprise tensioning or guiding members in the form of a quadrant and extend up to the region of the nosing rollers 21. In the vicinity of the nosing rollers 21 the chain 33 runs over sprockets 35 and 36. The guide rail 34 may be adjustable by means of a tensioning member 37, by which the tensioning of the sheet 20 may be accomplished. In this case the tensioning or guide member 34 can be made of several parts. Tensioning members are then provided in corresponding numbers, so that the adjustment of a point can be effected at which the maximum regulation can be obtained.

The rail 34 consists of an upper tensioning member 341, which has a greater diameter than the plate 25 and extends concentrically to the latter. The member 341 serves to stress the upper part 201 of the piece of sheet 20 and with it the conveying surface by means of the tensioning member 37, while the lower part 202 of the sheet 20 is guided by a guide member 342. This member 342 can be preset or it can be provided with one or more tensioning members, so as to impart a uniform tension to the sheet. Both guide rails 341 and 342 consist of an upper and a lower section, which are held at a given distance by spacing members 38. The latter corresponds substantially to the diameter of a horizontal link 39 of the round link chain 33, so that the horizontal links 39 in the space between the guide rings impart to the upper and lower chain section sufficient sliding guidance.

The drive of the round link chain 33 is effected via the driven sprocket 35, which is connected to a drive member 41 by the intermediary of a corresponding transmission 40. With the transfer of the chain from the sprockets 35, 36 to the guide members 34 of the springs 30 ensure, that even minor shocks of the chain are not transmitted to the conveying surface 20.

The angular guidance according to the embodiment shown in FIG. 1 allows any angle between 0° and 360° to be described. If a normal angular guidance in a plane of 90° is not sufficient, angular curvatures of 270° can be employed, in which the feed and receiving ends lie in different planes and overlap the feed and receiving belts 11 and 12. The curve negotiating characteristic of such an angular guidance belt is practically unrestricted, as the selection of the chain 33 in connection with the spring elements 30 can be adapted to practically all requirements. The driving members run outside the conveying region, which is especially advantageous in the case of foodstuffs, which in no case should come into contact with lubricants or the mechanical parts.

As the guide members 21 are freely rotatable as supported on the axis 22 and the whole driving operation is undertaken by the sprocket wheels 35 and 36, thus resulting in a simplified construction. The rollers 21 can therefore be of a very small diameter, which is adequate to ensure a deflection of the sheet 20 without the formation of creases or rides.

Figure 4:
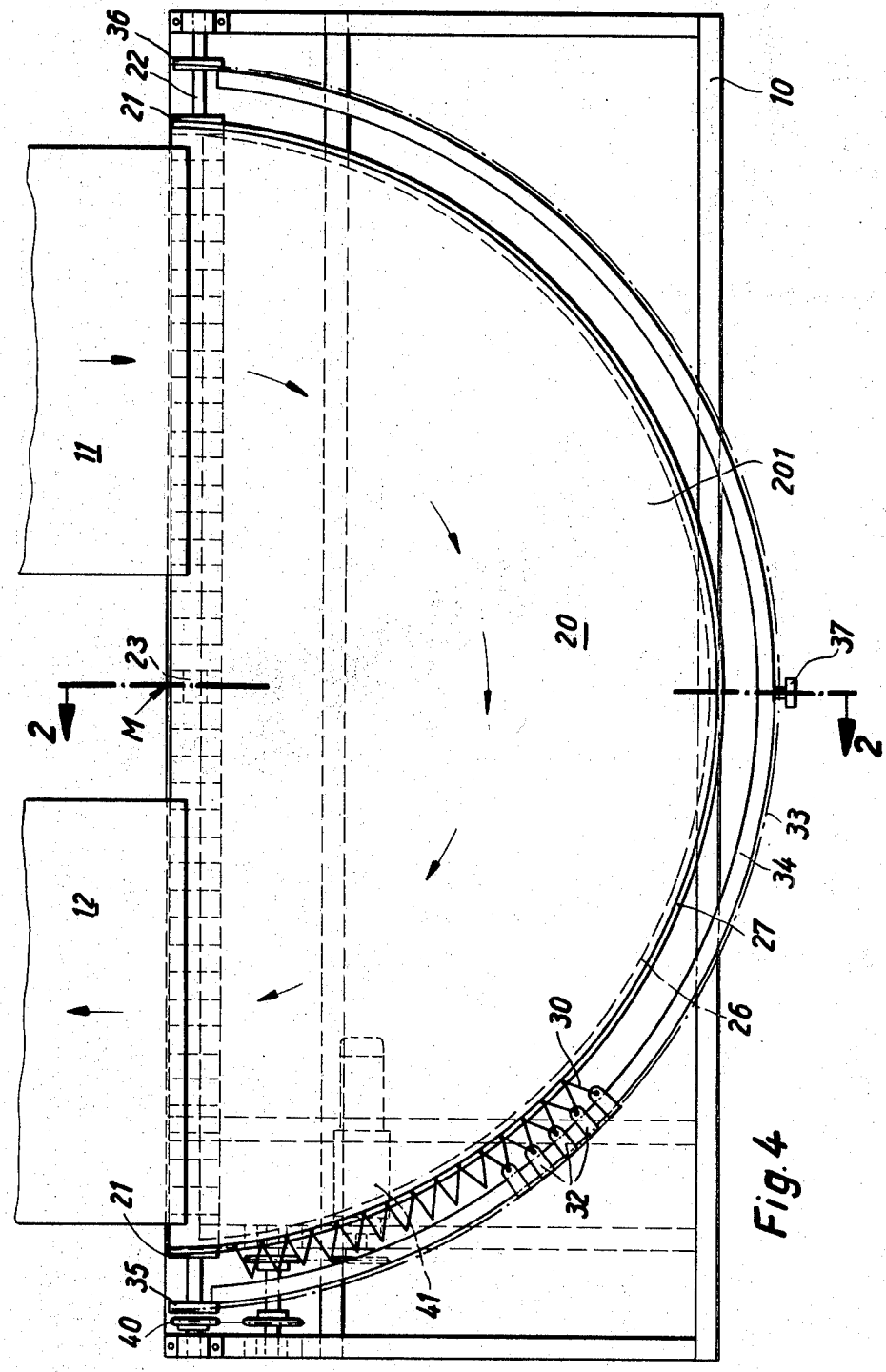

A conveying sheet is arranged on the machine frame according to a further embodiment of the invention, which is represented in FIG. 4, which fabric has a circular section. The conveying sheet 20 is so guided round nosing rollers 21, that the center M of the sheet is situated substantially at the height of the central part of a shaft 22, on which the rollers 21 are rotatably supported. The rollers 21 are preferably freely rotatable independent of one another. In the region of the center M a spacer sleeve 23 is freely carried on shaft 22. The sleeve 23 has a smaller outer diameter than the roller 21. The axis shaft 22 is carried at its outer free ends in bearings mounted on the machine frame 10.

Small articles of confectionery, such as pralines, or also other small items can in this way be passed over without trouble to and from adjacent conveyor belts. The angular deflection of the items is effected with uniform speed, so that the items arrive again for delivery in the set order. The items are neither turned on their base nor do they become mixed in any way. Contact between the individual items is not to be feared, which is of particular importance in the case of chocolate articles on account of their delicate surface. The deflection can, in particular with angles of 180°, in which a circular sheet is being used, be effected in the narrowest of spaces, the cost of construction being substantially limited.

I claim:

1. A conveyor belt turn comprising a frame having an arcuate guide rail corresponding an arc of 180°, nosing rollers mounted on a single shaft of the frame at both ends of the guide rail, a circular sheet forming an endless smooth conveying surface and consisting of a clothlike material, said circular sheet being carried by said frame and placed axially symmetrical over said nosing rollers; the free outer edge of the sheet being provided with a series of eyelets for the connection of resilient means, said resilient means being affixed to a round link driving chain engaging said guide rail, said round link chain being driven by sprocket wheels coaxial with said nosing rollers, said sprocket wheels being connected to driving means.

2. A conveyor belt turn as claimed in claim 1, wherein in the vicinity of the center (M) of said circular sheet one or more rollers are replaced by a spacer sleeve of smaller diameter.

3. A conveyor belt turn as claimed in claim 1, wherein below said conveying surface of the sheet there is provided a plate corresponding in plan form to the latter, on which plate said sheet is freely movable.

4. A conveyor belt turn as claimed in claim 1 wherein said endless round link chain is guided in said rails, which chain through the intermediary of spring elements is arranged concentrically to and at a small distance from the outer periphery of said conveying sheet and runs over said sprocket wheels supported on the shafts of the nosing rollers.

5. A conveyor belt turn as claimed in claim 1, wherein at the outer free end of each shaft a sprocket wheel is provided, said sprocket wheels engaging the driving chain, and one of said sprocket wheels being driven.

6. A conveyor belt turn as claimed in claim 1, wherein said eyelets are provided for each of two resilient elements each of which leads to adjacent connecting members carried by the chain links.

7. A conveyor belt turn as claimed in claim 1, wherein said resilient elements are coil springs.

8. A conveyor belt turn as claimed in claim 1, wherein said guide rails provided as tensioning members are made of several parts for guiding said chain.